(12) United States Patent
Sun et al.

(10) Patent No.: US 8,655,283 B2
(45) Date of Patent: Feb. 18, 2014

(54) CLUSTER-BASED COOPERATIVE SPECTRUM SENSING IN COGNITIVE RADIO SYSTEMS

(75) Inventors: Chunhua Sun, Hong Kong (CN); Wei Zhang, Hong Kong (CN); Khaled Ben Letaief, Hong Kong (CN)

(73) Assignee: Lingna Holdings Pte., LLC, Wilmington, DE (US)

( * ) Notice: Subject to any disclaimer, the term of this patent is extended or adjusted under 35 U.S.C. 154(b) by 1082 days.

(21) Appl. No.: 12/062,590

(22) Filed: Apr. 4, 2008

(65) Prior Publication Data

US 2008/0261639 A1 Oct. 23, 2008

Related U.S. Application Data

(60) Provisional application No. 60/913,438, filed on Apr. 23, 2007.

(51) Int. Cl.
*H04B 17/00* (2006.01)
(52) U.S. Cl.
USPC ......... 455/67.11; 455/515; 455/509; 375/224
(58) Field of Classification Search
None
See application file for complete search history.

(56) References Cited

U.S. PATENT DOCUMENTS

| 2007/0064829 A1* | 3/2007 | Zheng et al. | 375/267 |
| 2009/0143019 A1* | 6/2009 | Shellhammer | 455/67.11 |

OTHER PUBLICATIONS

Chen, T. et al: "COGMESH: A Cluster-Based Cognitive Radio Network", New Frontiers in Dynamic Spectrum Access Networks, 2007, DySPAN 2007, 2nd IEEE International Symposium on, Apr. 17-20, 2007, pp. 168-178.
Sun, Ch et al: "Cluster-Based Cooperative Spectrum Sensing in Cognitive Radio Systems", Communications, 2007. ICC '07. IEEE International Conference on, Jun. 24-28, 2007, pp. 2511-2515.
International Search Report & Written Opinion dated Apr. 3, 2009 for PCT Application Serial No. PCT/IB2008/003432, 10 pages.
Mitola, et al. Cognitive Radio: Making Software Radios More Personal. In: IEEE Personal Communications, Aug. 1999. Last accessed Sep. 25, 2008, 6 pages.
Haykin. Cognitive Radio: Brain-Empowered Wireless Communications. In: IEEE Journal on Selected Areas in Communications, vol. 23, pp. 201-220, Feb. 2005. Last accessed Sep. 25, 2008, 20 pages.
Cabric, et al. Implementation Issues in Spectrum Sensing for Cognitive Radios. In: Proceedings of Asilomar Conference on Signals, Systems and Computers, Pacific Grove, CA, USA, Nov. 7-10, 2004, pp. 772-776. Last accessed Sep. 25, 2008, 5 pages.
Ghasemi, et al. Collaborative Spectrum Sensing for Opportunistic Access in Fading Environments. In: Proceecings of 1st IEEE Symposium on New Frontiers in Dynamic Spectrum Access Networks, Baltimore, USA, Nov. 8-11, 2005, pp. 131-136. Last accessed Sep. 25, 2008, 6 pages.

(Continued)

*Primary Examiner* — Edward Urban
*Assistant Examiner* — Hsin-Chun Liao
(74) *Attorney, Agent, or Firm* — Turocy & Watson, LLP

(57) ABSTRACT

Cluster-based cooperative spectrum sensing is provided for cognitive radio systems. For each cluster of cognitive users, a cluster head is determined. Each cluster head collects energies of a reporting channel measured by the cognitive users within the cluster and decides whether a primary user is absent from a given spectrum. A common receiver then aggregates the cluster-level decisions made by the cluster heads, and makes a decision across multiple, or all of, the clusters whether the primary user is absent based on a fusion function of the cluster-level decisions. If the primary (licensed) user is absent, then secondary (unlicensed) users may utilize the spectrum.

31 Claims, 11 Drawing Sheets

(56) References Cited

OTHER PUBLICATIONS

Ganesan, et al. "Agility improvement through cooperation diversity in cognitive radio," in Proc. IEEE GLOBECOM, St.Louis, Missouri, USA, Nov. 28-Dec. 2, 2005, pp. 2505-2509. Last accessed Sep. 25, 2008, 5 pages.

Chamberland, et al. "The impact of fading on decentralized detection in power constrained wireless sensor networks," in Proc. IEEE ICASSP, Montreal, Canada, May 17-21, 2004, pp. 837-840. Last accessed Sep. 25, 2008, 4 pages.

Younis, et al. Distributed Clustering in Ad-hoc Sensor Networks: a Hybrid, Energy-Efficient Approach. In: Proc. IEEE INFOCOM, Hong Kong, China, Mar. 2004, pp. 629-640. Last accessed Sep. 25, 2008, 12 pages.

Bandyopadhyay, et al. An Energy Efficient Hierarchical Clustering Algorithm for Wireless Sensor Networks. In: Proc. IEEE INFOCOM, San Francisco, CA, USA, Apr. 2003, pp. 1713-1723. Last accessed Sep. 25, 2008, 11 pages.

Digham, et al. On the Energy Detection of Unknown Signals Over Fading Channels. In: Proc. IEEE Transactions on Communications, vol. 55, No. 1, Jan. 2007. Last accessed Sep. 25, 2008, 4 pages.

\* cited by examiner

Clustering of Cognitive Users

CLUSTER-BASED COOPERATIVE SPECTRUM SENSING IN COGNITIVE RADIO SYSTEMS

CROSS-REFERENCE TO RELATED APPLICATIONS

This application claims priority to U.S. Provisional Application Ser. No. 60/913,438, filed on Apr. 23, 2007, entitled "CLUSTER-BASED COOPERATIVE SPECTRUM SENSING IN COGNITIVE RADIO SYSTEMS", the entirety of which is incorporated herein by reference.

TECHNICAL FIELD

The subject disclosure relates to cooperative spectrum sensing by secondary users of cognitive radio systems via cluster-based methodologies.

BACKGROUND

By way of brief background, cognitive radio is a paradigm for wireless communication in which either a network or a wireless node changes its transmission or reception parameters to communicate efficiently without interfering with licensed users. This alteration of parameters is based on actively monitoring several factors in the external and internal radio environment, such as radio frequency spectrum, user behavior and network state.

In cognitive radio systems, the unlicensed (secondary) users can use the licensed spectrum as long as the licensed (primary) user is absent at some particular time slot and some specific geographic location. However, when the primary user comes back and is present again, the secondary users should vacate the spectrum instantly to avoid interference with the primary user. Hence, continuous spectrum sensing is used to monitor the existence of the primary user. However, sensing performance for a cognitive user is degraded when the channel experiences fading and shadowing.

Accordingly, cooperative spectrum sensing has been proposed to exploit multiuser diversity in sensing process. Conventionally, cooperative sensing is performed in two successive stages: sensing and reporting. In the sensing stage, every cognitive user performs spectrum sensing individually. In the reporting stage, all the local sensing observations are reported to a common receiver and the common receiver makes a final decision on the absence or the presence of the primary user.

Most existing systems focus on the case where observations are reported to the common receiver through perfect channels. However, this is impractical since the channels between the cognitive users and the common receiver are usually subject to fading. As mentioned, prior to accessing the licensed spectrum, cognitive users should detect whether the primary user is present or not. A variety of detection methods have been proposed thus far, but none that are optimal when it is assumed a priori knowledge of the primary user is unavailable.

Accordingly, improved systems and methods are desired for improving sensing performance for cooperative spectrum sensing in the presence of fading and shadowing without assuming a priori knowledge of the primary user. The above-described deficiencies of current designs are merely intended to provide an overview of some of the problems of today's designs, and are not intended to be exhaustive. Other problems with the state of the art of cognitive radio and corresponding benefits of the embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments in a simplified form as a prelude to the more detailed description that follows.

In exemplary, non-limiting embodiments, cluster-based cooperative spectrum sensing is provided for cognitive radio systems. For each cluster of cognitive users, a cluster head is determined. Each cluster head collects energies of a reporting channel measured by the cognitive users within the cluster and decides whether a primary user is absent from a given spectrum. A common receiver then aggregates the cluster-level decisions made by the cluster heads, and makes a decision across all the clusters whether the primary user is absent based on a fusion function of the cluster-level decisions. If the primary (licensed) user is absent, then secondary (unlicensed) users may utilize the spectrum. Other embodiments are described below.

BRIEF DESCRIPTION OF THE DRAWINGS

The various embodiments for the cluster-based cooperative spectrum sensing are further described with reference to the accompanying drawings in which.

DETAILED DESCRIPTION

Overview

As mentioned in the background, in cognitive radio systems, secondary users can be coordinated to perform cooperative spectrum sensing to detect the primary user more accurately. However, when the sensing observations are forwarded to a common receiver through fading channels, the sensing performance can be severely degraded. In accordance with various non-limiting embodiments, cluster-based cooperative spectrum sensing methods are provided to improve the overall sensing performance of cognitive users.

By separating secondary users into a few clusters and selecting the most favorable user in each cluster to report to the common receiver, the cluster-based cooperative spectrum sensing methods exploit the user selection diversity to enhance the sensing performance. Embodiments include, but are not limited to, the use of decision fusion and energy fusion techniques. As results show, in practice, the invention improves sensing performance significantly compared to conventional spectrum sensing.

In accordance with various embodiments described herein, it is assumed that the reporting channel, i.e., the channel between cognitive users and the common receiver, experiences Rayleigh fading. For such circumstances, as mentioned, cluster-based cooperative spectrum sensing methods are provided to improve the sensing performance. The clustering step may be performed by upper layers according to any known clustering algorithm, e.g., existing distributed clustering or other expedient algorithms may be adopted for the clustering step.

Then, the most favorable user, i.e., the cluster head is designated. In one non-limiting embodiment, the cluster head is selected to have largest reporting channel gain, in order to collect the sensing results from all the other users in the same cluster and to forward the results to the common receiver. By employing such selection technique, the reporting error due to the fading channel is reduced. Moreover, both decision fusion and energy fusion can be applied. In non-limiting detail, the analytical sensing results are presented herein.

Figure 1:
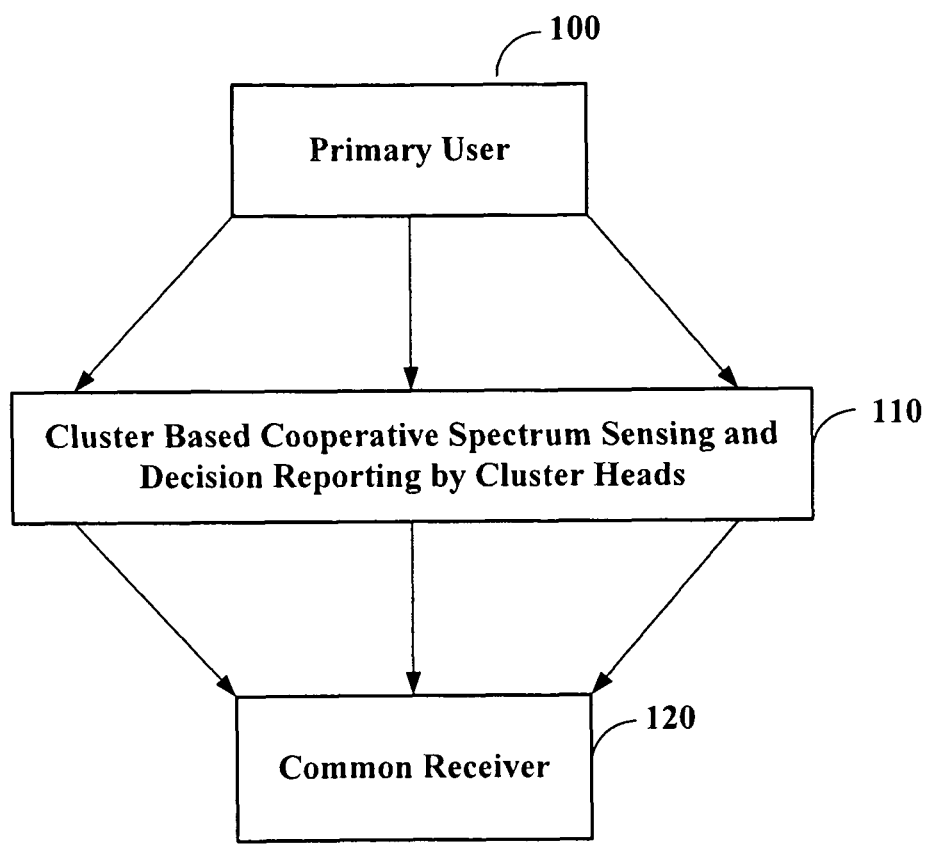
FIG. 1 illustrates a high-level block diagram of cluster-based cooperative spectrum sensing.

FIG. 1 is an exemplary, non-limiting block diagram illustrating the context in which the cluster based cooperative spectrum sensing operates. As mentioned, a goal of cognitive radio spectrum sensing is to detect the presence of the primary user 100 on a spectrum of interest. If the primary user 100 is not present, other secondary, unlicensed users may utilize the spectrum without harming or interfering with the use of the spectrum of primary, licensed user 100.

Prior to sensing by the cognitive users of the energy of the primary user 100, the cognitive users are clustered into a set of clusters 110. Then, within each cluster, a cluster head is chosen as an optimal node within the cluster to which each of the nodes of the cluster transmit their local observations of the energy of primary user 100. The cluster head of each cluster of clusters 110 collects the local observations within the cluster and generates a decision for the cluster. The cluster heads then report their decisions to the common receiver 120, which in turn allows access to the spectrum if none of the decisions from the cluster heads of clusters 110 indicates the presence of the primary user 100.

Figure 2:
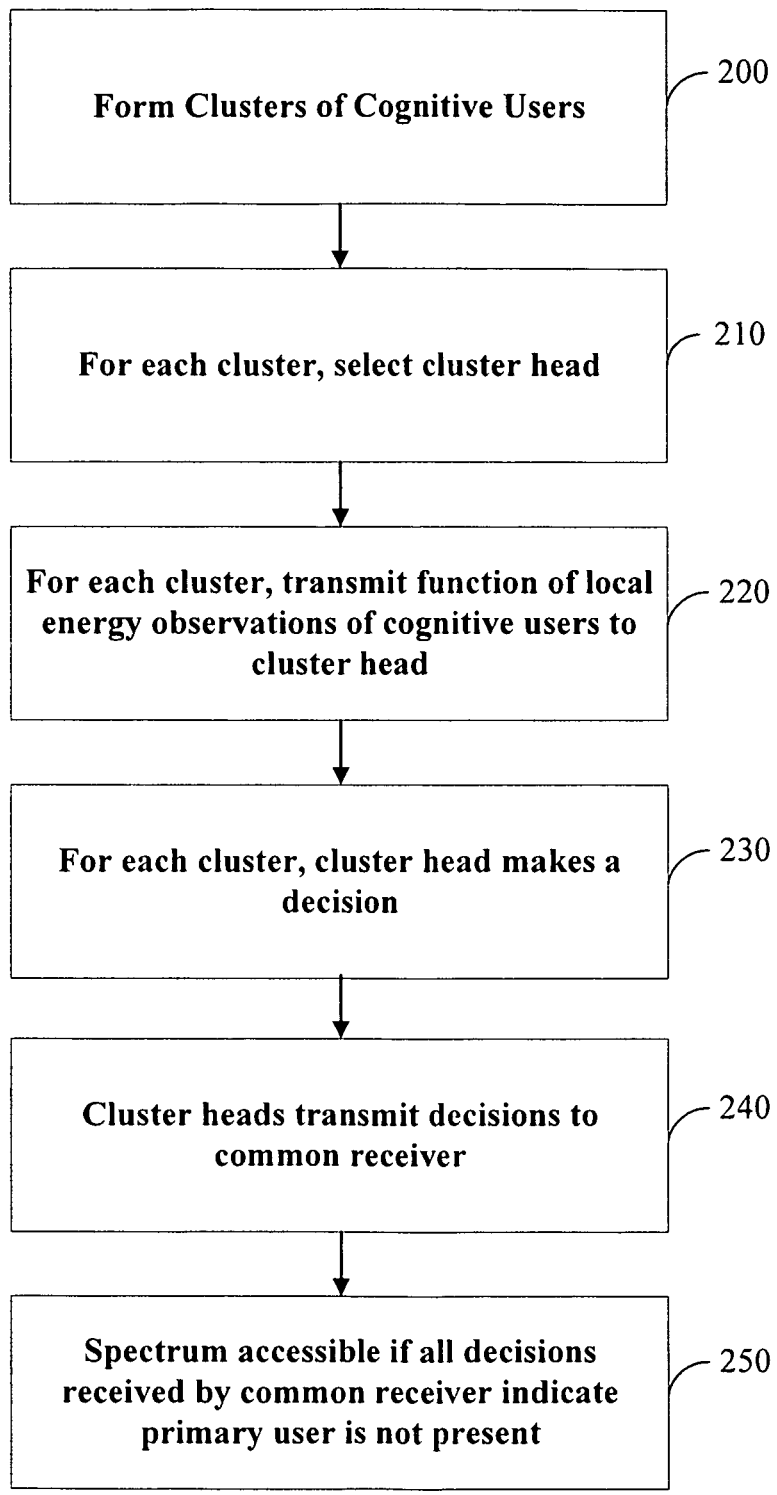
FIG. 2 illustrates a flowchart of a method of performing cluster-based cooperative spectrum sensing.

The methodology is further illustrated in the exemplary non-limiting flow diagram of FIG. 2. At 200, cognitive users are clustered into a plurality of clusters of one or more cognitive users in each cluster. At 210, an optimal cluster head is determined for each cluster. At 220, within each cluster, each of the cognitive users transmits a function of the local energy observed to the cluster head. At 230, the cluster head makes a decision based on the collective observations of the cognitive users of the cluster. At 240, each of the cluster heads transmits a cluster-level decision to the common receiver. At 250, the common receiver receives the cluster-level decisions and in one non-limiting embodiment, if all the decisions received indicate the primary user is not using the licensed spectrum, then the spectrum may be permissibly used by secondary users.

In the below description, cooperative spectrum sensing is discussed including various non-limiting embodiments of the cluster-based cooperative spectrum sensing including alternate fusion methodologies. Then, some non-limiting results are provided that demonstrate the efficacy of the embodiments described herein. Afterwards, some further background about cognitive radio systems is provided for contextual relevance, followed by description of some exemplary, non-limiting network operating environments and/or devices for optional implementation.

Cluster-Based Cooperative Spectrum Sensing

A variety of factors, such as the hidden node problem, deep fading and shadowing, deteriorate the sensing performance of cognitive users of cognitive radio systems. To overcome this problem, cognitive users can collaborate or cooperate to perform spectrum sensing. Conventionally, cooperative spectrum sensing is coordinated by a common receiver. After receiving the authorization from the common receiver, all the cognitive users initiate spectrum sensing independently and then forward their observations to the common receiver.

If the channels between cognitive users and the common receiver are perfect and decision fusion is employed at the common receiver, the false alarm probability $Q_f$, the detection probability $Q_d$ and the missing probability $Q_m$ of the cooperative spectrum sensing are respectively given by:

$$Q_f = 1 - \prod_{i=1}^{N}(1 - P_{f,i}), \quad \text{Eqn. 1}$$

$$Q_d = 1 - \prod_{i=1}^{N}(1 - P_{d,i}), \quad \text{Eqn. 2}$$

$$Q_m = \prod_{i=1}^{N} P_{m,i}, \quad \text{Eqn. 3}$$

where N is the number of cognitive users and $P_{f,i}$, $P_{d,i}$, $P_{m,i}$ are the false alarm probability, the detection probability and the missing probability for the ith cognitive user, respectively, given by:

$$P_{f,i} = E_{\gamma_i}[\text{Prob}\{H_1|H_0\}] \quad \text{Eqn. 4}$$
$$= \frac{\Gamma\left(u, \frac{\lambda}{2}\right)}{\Gamma(u)},$$

$$P_{d,i} = E_{\gamma_i}[\text{Prob}\{H_1|H_1\}] \quad \text{Eqn. 5}$$
$$= e^{-\frac{\lambda}{2}} \sum_{n=0}^{u-2} \frac{1}{n!}\left(\frac{\lambda}{2}\right)^n + \left(\frac{1+\overline{\gamma}_i}{\overline{\gamma}_i}\right)^{u-1} \times$$
$$\left[e^{-\frac{\lambda}{2(1+\overline{\gamma}_i)}} - e^{-\frac{\lambda}{2}} \sum_{n=0}^{u-2} \frac{1}{n!}\left(\frac{\lambda \overline{\gamma}_i}{2(1+\overline{\gamma}_i)}\right)^n\right],$$

$$P_{m,i} = 1 - P_{d,i}, \quad \text{Eqn. 6}$$

and where $H_0$ and $H_1$ denote the absence and the presence of the primary user, respectively, $\overline{\gamma}_i$ denotes the average SNR at the ith cognitive radio, $E_{\gamma_i}[\cdot]$ represents the expectation over the random variable $\gamma_i$ which is Rayleigh distributed, Prob{•} stands for the probability, $\Gamma(•,•)$ is the incomplete gamma function and $\Gamma(•)$ is the gamma function, $\lambda$ is the threshold of the energy detector and u is the time bandwidth product. For exemplary non-limiting implementations, u=5 is used herein.

As mentioned, in practice, the reporting channels may experience fading which will deteriorate the performance of the cooperative spectrum sensing. Cluster-based cooperative spectrum sensing in cognitive radio systems is thus proposed.

Let $P'_{f,i}$ denote the probability of receiving $H_1$ at the common receiver (after decoding) when the ith cognitive radio sends $H_0$ and $P'_{m,i}$ denote the probability of receiving $H_0$ at the common receiver (after decoding) when the ith cognitive radio reports $H_1$. Then, $Q_f$ and $Q_m$ are:

$$Q_f = 1 - \prod_{i=1}^{N} [(1 - P_{f,i})(1 - P'_{f,i}) + P_{f,i}P'_{m,i}],\qquad \text{Eqn. 7}$$

$$Q_m = \prod_{i=1}^{N} [P_{m,i}(1 - P'_{f,i}) + (1 - P_{m,i})P'_{m,i}].\qquad \text{Eqn. 8}$$

It can be seen that $P'_{f,i}=P'_{m,i}$. For notation brevity, $P_{e,i}$ is used herein to represent the reporting error probability, i.e., $P_{e,i}=P'_{f,i}=P'_{m,i}$. From the above equations 7 and 8, it is known that $Q_m$ is degraded by the imperfect reporting channel and $Q_f$ is bounded by the reporting error probability. This means that spectrum sensing cannot be successfully conducted when the desired $Q_f$ is smaller than the bound $\overline{Q_f}$.

Accordingly, in order to reduce the reporting error $P_{e,i}$ of equations 7 and 8 and improve the sensing performance, cluster-based cooperative spectrum sensing can be implemented as described herein making the following assumptions: (1) the instantaneous channel state information (CSI) of the reporting channel is available at the cognitive users and (2) the channel between any two users in the same cluster is perfect since they are close to each other.

Figure 3:
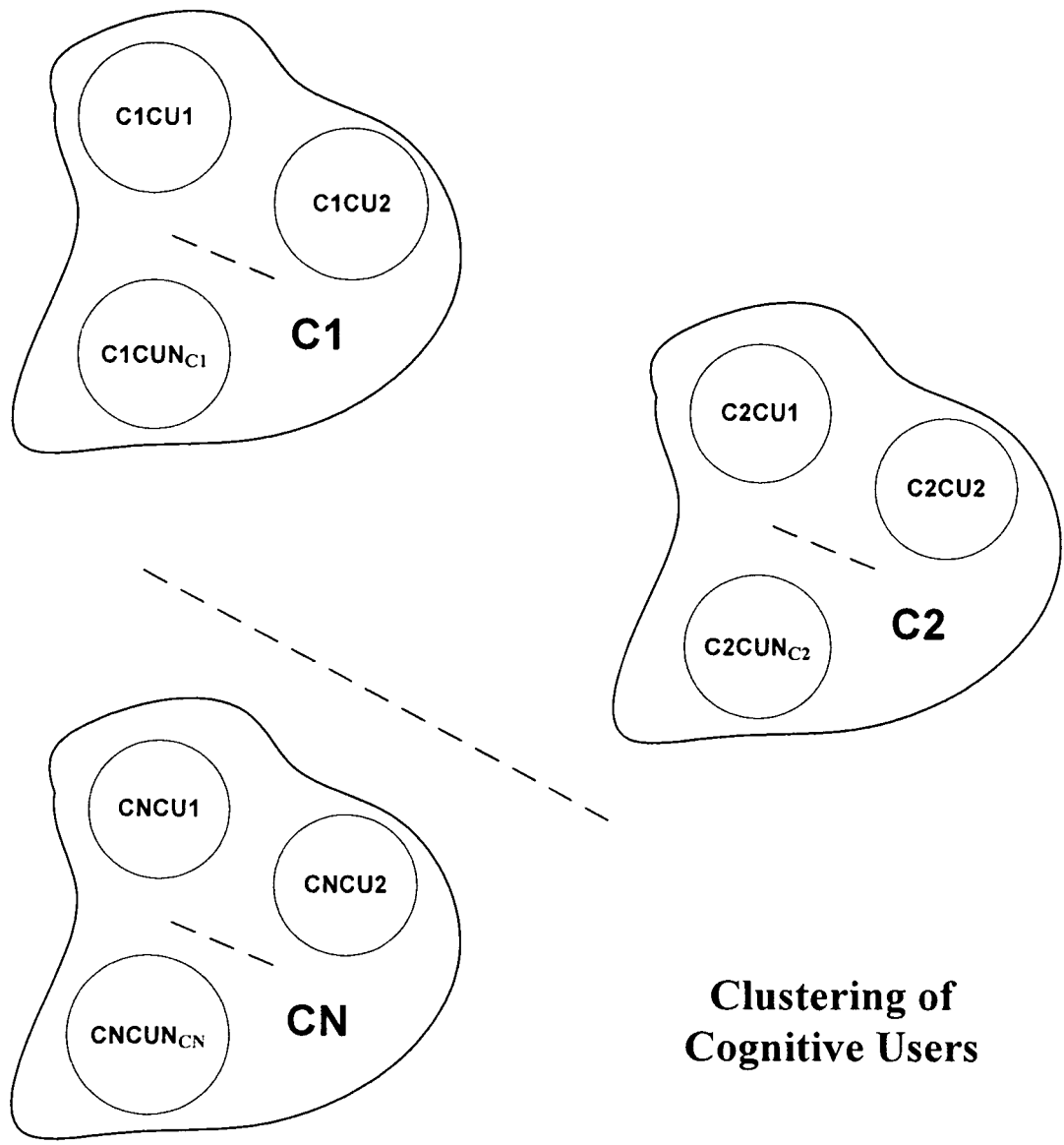
FIG. 3 is an exemplary, non-limiting block diagram showing a process for clustering cognitive users.

Initially, as shown in FIG. 3, the cognitive users are assumed to be separated into a few clusters C1, C2, . . . , CN, each having a clustered set of cognitive users C1CU1, C1CU2, . . . , C1CUN$_{C1}$, C2CU1, C2CU2, . . . , C2CUN$_{C2}$, . . . , CNCU1, CNCU2, . . . , CNCUN$_{CN}$, respectively by any clustering algorithm, such as a distributed clustering algorithm. In FIG. 3, for the avoidance of doubt, the number of cognitive users in each cluster can be different, i.e., each cluster can independently have different cognitive users and a different number of cognitive users. For instance, Cluster 1 may have N$_{C1}$ cognitive users and Cluster 2 may have N$_{C2}$ cognitive users, where N$_{C1}$ is a different number of cognitive users than N$_{C2}$.

Thus given a set of clusters of cognitive users as shown in FIG. 3, the present embodiment of the method is further illustrated with reference to the block diagram of FIG. 4 in the context of two clusters Cluster 1 and Cluster 2, though one can appreciate that the method can be extended to, and is effective with, any number of clusters.

Figure 4:
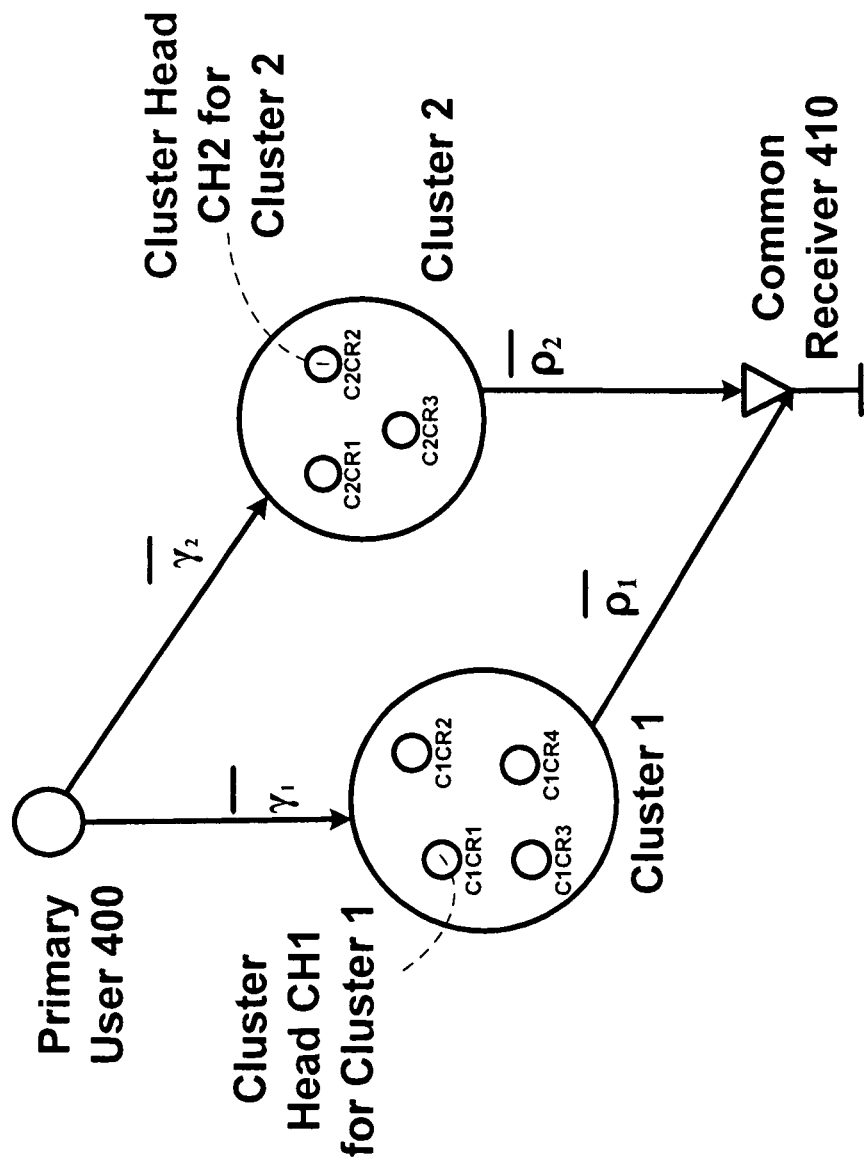
FIG. 4 is an exemplary non-limiting block diagram illustrating an aspect of cluster-based cooperative spectrum sensing.

In FIG. 4, Cluster 1, for example, has 4 cognitive radios C1CR1, C1CR2, C1CR3 and C1CR4 and Cluster 2, for example, has 3 cognitive radios C2CR1, C2CR2 and C2CR3. $\overline{\gamma_1}$ indicates the average channel gain from primary user 400 to Cluster 1 and $\overline{\rho_1}$ indicates the average channel gain from the Cluster 1 to common receiver 410. Similarly, $\overline{\gamma_2}$ indicates the average channel gain from primary user 400 to Cluster 2 and $\overline{\rho_2}$ indicates the average channel gain from the Cluster 2 to common receiver 410. As mentioned, the cluster heads CH1 and CH2 for Cluster 1 and Cluster 2 perform the collecting and reporting of cooperative sensing information for the cognitive radios of their respective cluster.

In one embodiment, after the cognitive users are clustered, the most favorable user is selected according to the largest instantaneous reporting channels gain, i.e., the cluster heads CH1 and CH2 for clusters Cluster 1 and Cluster 2, respectively, as illustrated in FIG. 4. For instance, in Cluster 1, the cluster head CH1 might be the first cognitive radio C1CR1 of Cluster 1 and in Cluster 2, the cluster head CH2 might be the second cognitive radio C2CR2 of Cluster 2. Subsequently, the cooperative spectrum sensing may be conducted through the following steps:

Every cognitive radio j in cluster i collects the energy $O_{i,j}$ and sends a local observation $G_{i,j}$ to the cluster head, where $G_{i,j}$ is related to $O_{i,j}$ by a function $\Omega$:

$$G_{i,j}=\Omega(O_{i,j}), i=1, 2, \ldots, K, j=1, 2, \ldots, N_i,\qquad \text{Eqn. 9}$$

where K is the number of clusters and $N_i$ is the number of cognitive users in the ith cluster.

The cluster head receives those local observations in the same cluster and then makes a cluster decision $B_i$ according to some fusion function $\Phi$, as:

$$B_i=\Phi(G_{i,1}, G_{i,2}, \ldots, G_{i,N_i}), i=1, 2, \ldots, K.\qquad \text{Eqn. 10}$$

The cluster decisions $B_i$ for all i are reported to the common receiver and then a final decision H is made according to a fusion function $\psi$, as:

$$H=\psi(\hat{B}_1, \hat{B}_2, \ldots, \hat{B}_K),\qquad \text{Eqn. 11}$$

where $\hat{B}_1, \hat{B}_2, \ldots, \hat{B}_K$ are the recovered signals (1 or 0) at the common receiver (after decoding).

As mentioned, different fusion functions in wireless sensor networks can be used in the common receiver. In order to avoid interference to the primary user, cognitive users are allowed to access the spectrum when all the reported decisions demonstrate that the primary user 400 of FIG. 4 is absent. Otherwise, the primary user 400 is assumed present.

Thus, an OR-rule may be adopted in the common receiver 410 as follows:

$$\psi : H = \begin{cases} 1, & \sum_{i=1}^{K} \hat{B}_i \geq 1, \\ 0, & \text{otherwise} \end{cases}\qquad \text{Eqn. 12}$$

Let $Q_{f,i}$, $Q_{d,i}$ and $Q_{m,i}$ denote the false alarm probability, the detection probability and the missing probability of the cluster head in cluster i, respectively. Let $Q_{e,i}$ denote the error probability that the cluster decision $B_i$ is reported to the common receiver 410 of FIG. 4 but the decision $\hat{B}_i$ is obtained. Then, the system performance of the cluster-based cooperative spectrum sensing can be evaluated from equations 7 and 8 as:

$$Q_f = 1 - \prod_{i=1}^{K} [(1 - Q_{f,i})(1 - Q_{e,i}) + Q_{f,i}Q_{e,i}],\qquad \text{Eqn. 13}$$

$$Q_m = \prod_{i=1}^{K} [Q_{m,i}(1 - Q_{e,i}) + (1 - Q_{m,i})Q_{e,i}].\qquad \text{Eqn. 14}$$

Because the cluster decision $B_i$ is sent through the best channel among all $N_i$ reporting channels in cluster i, a diversity gain of $N_i$ can be obtained over the Rayleigh fading channels. In the following, cluster i is used as an example to derive the reporting error probability $Q_{e,i}$ and to show such a diversity enhancement.

Let $\rho_{max,i}$ denote the channel SNR from the cluster head to the common receiver 410, i.e.:

$$\rho_{max,i} = \max(\rho_{i,1}, \rho_{i,2}, \ldots, \rho_{i,N_i}),$$

where $\rho_{i,j}$ denotes the channel SNR from user j in cluster i to the common receiver 410 which is exponentially distributed with the same mean value $\bar{\rho}_i$ because they are assumed close to each other. The probability density function of $\rho_{max,i}$ is:

$$f(x) = \frac{N_i}{\bar{\rho}_i} e^{-\frac{x}{\bar{\rho}_i}} \left(1 - e^{-\frac{x}{\bar{\rho}_i}}\right)^{N_i - 1}. \quad \text{Eqn. 15}$$

If the cognitive users in one cluster have different path loss to the common receiver 410, the probability density function of $\rho_{max,i}$ can also be easily obtained from order statistics.

For a given $\rho_{max,i}$, the error probability, assuming BPSK for simplicity, is:

$$Q_{e,i|\rho_{max,i}} = Q(\sqrt{2\rho_{max,i}}), \quad \text{Eqn. 16}$$

where $Q(\bullet)$ is the Q-function. Therefore, the average error probability over Rayleigh fading channels is given by:

$$Q_{e,i} = \int_0^\infty Q_{e,i|\rho_{max,i}} f(\rho_{max,i}) d\rho_{max,i} \quad \text{Eqn. 17}$$

$$= \sum_{m=0}^{N_i - 1} \binom{N_i - 1}{m} (-1)^{N_i - m - 1} \frac{N_i}{2(N_i - m)} \times$$

$$\left(1 - \sqrt{\frac{\bar{\rho}_i}{N_i - m + \bar{\rho}_i}}\right).$$

Figure 5:
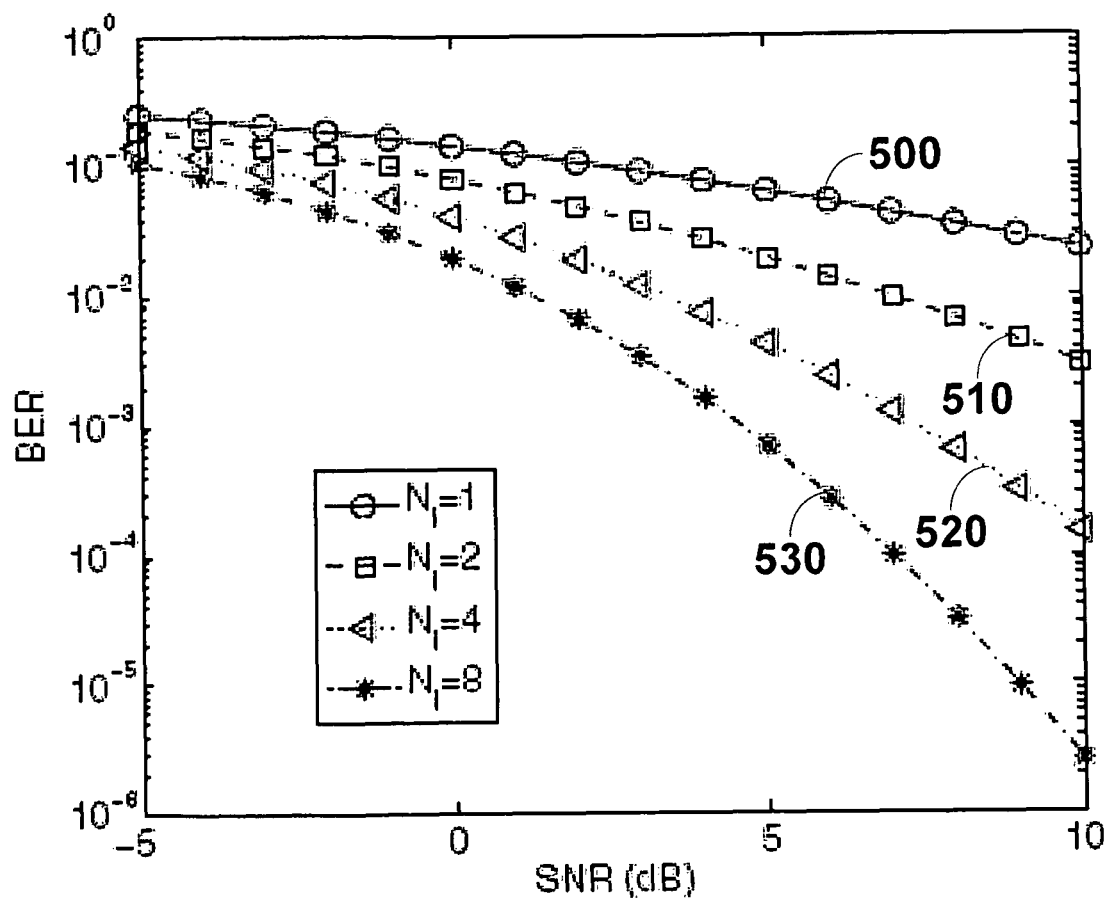
FIG. 5 shows an exemplary reporting error comparison for different numbers of cognitive users in accordance with the cluster-based cooperative spectrum sensing techniques.

FIG. 5 shows the comparison of reporting errors for different number of cognitive users, i.e., bit error rate (BER) versus the average signal to noise ratio (SNR) for different number of cognitive users in cluster i, $N_i=1,2,4,8$, according to equation 17. Curve 500 represents the average SNR v. BER for 1 cognitive user, curve 510 represents the average SNR v. BER for 2 cognitive users, curve 520 represents the average SNR v. BER for 4 cognitive users and curve 530 represents the average SNR v. BER for 8 cognitive users. It can be seen that, for the same SNR, as the number of the cognitive users increases, the reporting error decreases. This advantageously indicates that a selection diversity $N_i$ is achieved via the clustering described herein.

Next, the false alarm probability $Q_{f,i}$ the detection probability $Q_{d,i}$ and the missing probability $Q_{m,i}$ of cluster i for two different fusion rules are derived.

Decision fusion (DF) for cooperative spectrum sensing is described by the two fusion functions, $\Omega$ and $\Phi$ as follows:

$$\Omega: G_{i,j} = \begin{cases} 1, & O_{i,j} > \lambda, \\ 0, & \text{otherwise} \end{cases} \quad \text{Eqn. 18}$$

$$\Phi: B_i = \begin{cases} 1, & \sum_{j=1}^{N_i} G_{i,j} \geq 1, \\ 0, & \text{otherwise} \end{cases} \quad \text{Eqn. 19}$$

where each user in cluster i makes a binary decision by comparing its energy to a pre-defined threshold $\lambda$ and then the cluster head for cluster i makes a decision by applying an OR-rule to all the decisions in the same cluster. Therefore, according to equations 1 and 3, $Q_{f,i}$ and $Q_{m,i}$ for the cluster i can be given by:

$$Q_{f,i} = 1 - \prod_{j=1}^{N_i} (1 - P_{f,i,j}), \quad \text{Eqn. 20}$$

$$Q_{m,i} = \prod_{j=1}^{N_i} P_{m,i,j}, \quad \text{Eqn. 21}$$

where $P_{f,i,j}$ and $P_{m,i,j}$ are the false alarm probability and the missing probability for the jth cognitive user in the ith cluster, respectively and are given by equations 4 and 6. By substituting equations 20, 21 and 17 into equations 13 and 14, the analytical results of the cluster-based cooperative spectrum sensing with decision fusion are obtained.

In the special case when every user is regarded as a cluster, i.e., $N_i=1$ and $K=N$, it is observed that the cluster-based cooperative spectrum sensing is equivalent to the conventional one by comparing equations 13 and 14 with equations 7 and 8.

Energy fusion (EF) is described by the following two fusion functions, $\Omega$ and $\Phi$:

$$\Omega: G_{i,j} = O_{i,j}, \quad \text{Eqn. 22}$$

$$\Phi: B_i = \begin{cases} 1, & \sum_{j=1}^{N_i} G_{i,j} \geq \lambda, \\ 0, & \text{otherwise} \end{cases} \quad \text{Eqn. 23}$$

where the cluster head collects the energy measured by all the users in the same cluster and then makes the final decision by comparing it with a pre-fixed threshold.

Note that the energy $O_{i,j}$ follows the distribution:

$$f(O_{i,j}) \sim \begin{cases} \chi^2_{2u}, & H_0 \\ \chi^2_{2u}(2\gamma_{i,j}), & H_1 \end{cases} \quad \text{Eqn. 24}$$

where $\chi^2_{2u}$ represents a central chi-square distribution with 2u degrees of freedom and $\chi^2_{2u}(2\gamma_{i,j})$ represents a non-central chi-square distribution with 2u degrees of freedom and a non-centrality parameter $2\gamma_{i,j}$. $\gamma_{i,j}$ is the instantaneous SNR for user j in cluster i, which is exponentially distributed with the mean value $\bar{\gamma}_i$.

For the cluster head of cluster i, the collected energy can be denoted by $$G_i = \sum_{j=1}^{N_i} O_{i,j}.$$

Hence, from equation 24, the density function of $G_i$ is:

$$f(G_i) \sim \begin{cases} \chi^2_{2N_i u}, & H_0 \\ \chi^2_{2N_i u}(2\gamma_i), & H_1 \end{cases} \quad \text{Eqn. 25}$$

where $$\gamma_i = \sum_{j=1}^{N_i} \gamma_{i,j}.$$

is the instantaneous SNR at the cluster head in cluster i. From equation 25, the false alarm probability of cluster i can be given by:

$$Q_{f,i} = \text{Prob}(G_i > \lambda | H_0) \quad \text{Eqn. 26}$$
$$= \int_\lambda^\infty \chi^2_{2N_i u} dG_i$$
$$= \frac{\Gamma(N_i u, \frac{\lambda}{2})}{\Gamma(N_i u)}.$$

Likewise, for a given $\gamma_i$, the detection probability of cluster i is given by:

$$Q_{d,i|\gamma_i} = \text{Prob}(G_i > \lambda | H_1) \quad \text{Eqn. 27}$$
$$= \int_\lambda^\infty \chi^2_{2N_i u}(2\gamma_i) dG_i$$
$$= Q_{N_i u}(\sqrt{2\gamma_i}, \sqrt{\lambda}).$$

where $Q_u(a,b)$ is the generalized Marcum Q-function. Moreover, $\gamma_i$ follows the distribution:

$$f(\gamma_i) = \frac{\gamma_i^{N_i-1}}{(N_i-1)!\bar{\gamma}_i^{N_i}} e^{-\frac{\gamma_i}{\bar{\gamma}_i}}. \quad \text{Eqn. 28}$$

Hence the detection probability $Q_{d,i}$ and the missing probability $Q_{m,i}$ can be given by:

$$Q_{d,i} = \int_0^\infty Q_{d,i|\gamma_i} f(\gamma_i) d\gamma_i \quad \text{Eqn. 29}$$
$$= \int_0^\infty Q_{N_i u}(\sqrt{2\gamma_i}, \sqrt{\lambda}) \times$$
$$\frac{\gamma_i^{N_i-1}}{(N_i-1)!\bar{\gamma}_i^{N_i}} e^{-\frac{\gamma_i}{\bar{\gamma}_i}} d\gamma_i,$$

$$Q_{m,i} = 1 - Q_{d,i}. \quad \text{Eqn. 30}$$

By substituting equations 26, 30 and 17 into equations 13 and 14, the analytical results for the cluster-based spectrum sensing with energy fusion can be obtained.

Figure 6:
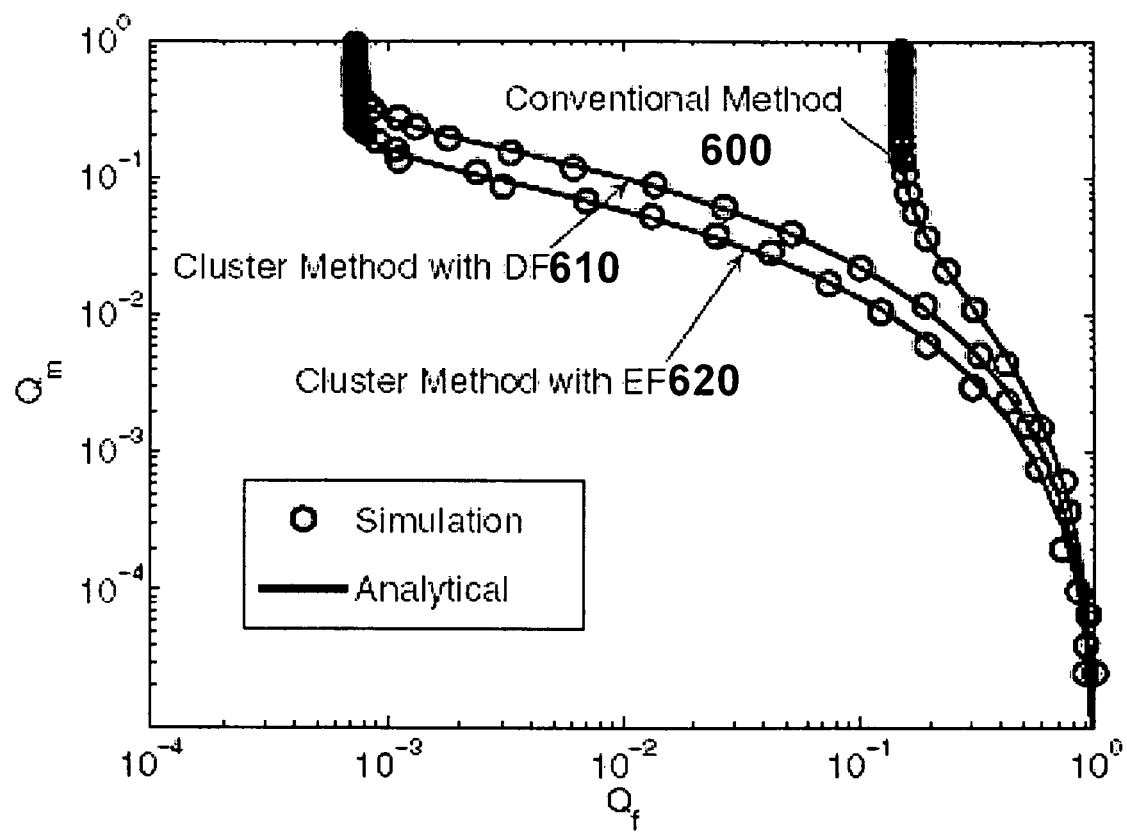
FIGS. 6 and 7 are illustrative graphs showing the comparative advantage and benefits of the cluster-based cooperative spectrum sensing techniques.
Figure 7:
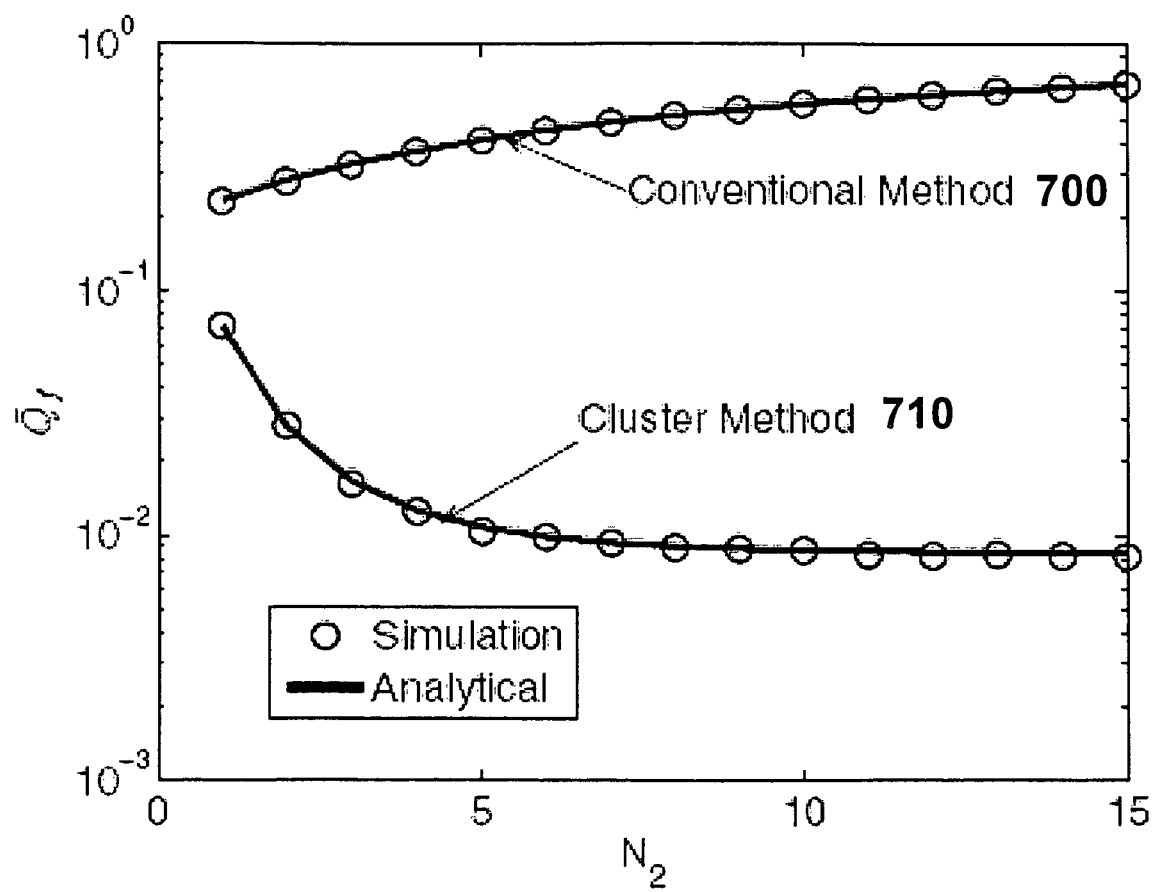

FIGS. 6 and 7 show some non-limiting results to demonstrate the performance of the cluster-based cooperative spectrum sensing. FIG. 6 shows the complementary receiver operating characteristic performance ($Q_m$ vs. $Q_f$) of cluster-based cooperative spectrum sensing with the DF scheme and EF scheme described above, respectively. For comparison, the conventional method is also simulated, i.e., all the cognitive users send their observations independently to the common receiver. The simulation settings for the cluster-based method are as follows:
K=2;
$N_1$=4;
$N_2$=3;
$\bar{\gamma}_1$=10 dB;
$\bar{\gamma}_2$=5 dB;
$\bar{\rho}_1$=10 dB;
$\bar{\rho}_2$=10 dB.

It can be seen from FIG. 6 that the analytical results match the simulation results very well for all the simulated methods. For a given $Q_f$, $Q_m$ of the cluster-based cooperative spectrum sensing with the DF (curve 610) and the EF (curve 620), both decrease advantageously compared with the conventional method (curve 600). It can also be observed that the bound of $Q_f$ for the DF and the EF are almost identical and smaller than that of the conventional method. This can be explained as follows. For the DF scheme, from equations 13 and 20, the bound $\overline{Q}_f$ is given by:

$$\overline{Q}_f \triangleq \lim_{\lambda \to \infty} Q_f = 1 - \prod_{i=1}^K (1 - Q_{e,i}) \quad \text{Eqn. 31}$$

and for the EF, from equations 13 and 26, $\overline{Q}_f$ is also given by equation 31.

FIG. 7 shows the relationship between the number of users and $\overline{Q}_f$ for both the cluster-based method (curve 710) and the conventional method (curve 700), i.e., FIG. 7 shows the bound of $Q_f$ ($\overline{Q}_f$) vs. the number of cognitive users Here, $N_1$=3, $N_2$ varies from 1 to 15, and N=$N_1$+$N_2$, $\bar{\gamma}_i$=5 dB and $\bar{\rho}_i$=5 dB, for i=1, 2, . . . , N. Simulation and analytical results are shown to match very well. For a fixed $N_2$, it can be seen that $\overline{Q}_f$ of the cluster-based method is smaller than that of the traditional method. Moreover, $\overline{Q}_f$ decreases with the increase of the number of users whereas it increases for the conventional method, which can be explained as follows.

For the cluster-based method, $\overline{Q}_f$ is given by equation 31 while for the traditional method, from equation 7 $\overline{Q}_f$ is given by:

$$\overline{Q}_f \triangleq \lim_{\lambda \to \infty} Q_f = 1 - \prod_{i=1}^N (1 - P_{e,i}). \quad \text{Eqn. 32}$$

For the fixed number of $N_2$, since K≤N and $Q_{e,i} \leq P_{e,i}$, $\overline{Q}_f$ in equation 31 is smaller than that in equation 32. When $N_2$ increases, $\overline{Q}_f$ in equation 32 will increase while $\overline{Q}_f$ in equation 31 will decrease because $Q_{e,2}$ becomes smaller. Suppose that $N_2$ becomes very large, $Q_{e,2}$ is then approaching 0 and equation 31 can be approximated by $\overline{Q}_f$=$Q_{e,1}$. This is illustrated in FIG. 7, which shows the curve trends to be a horizontal line when $N_2$ increases. Therefore, even though the desired $Q_f$ is very small for a large number of cognitive radios, spectrum sensing can still be successfully conducted by the cluster-based methodologies described herein.

Figure 8:
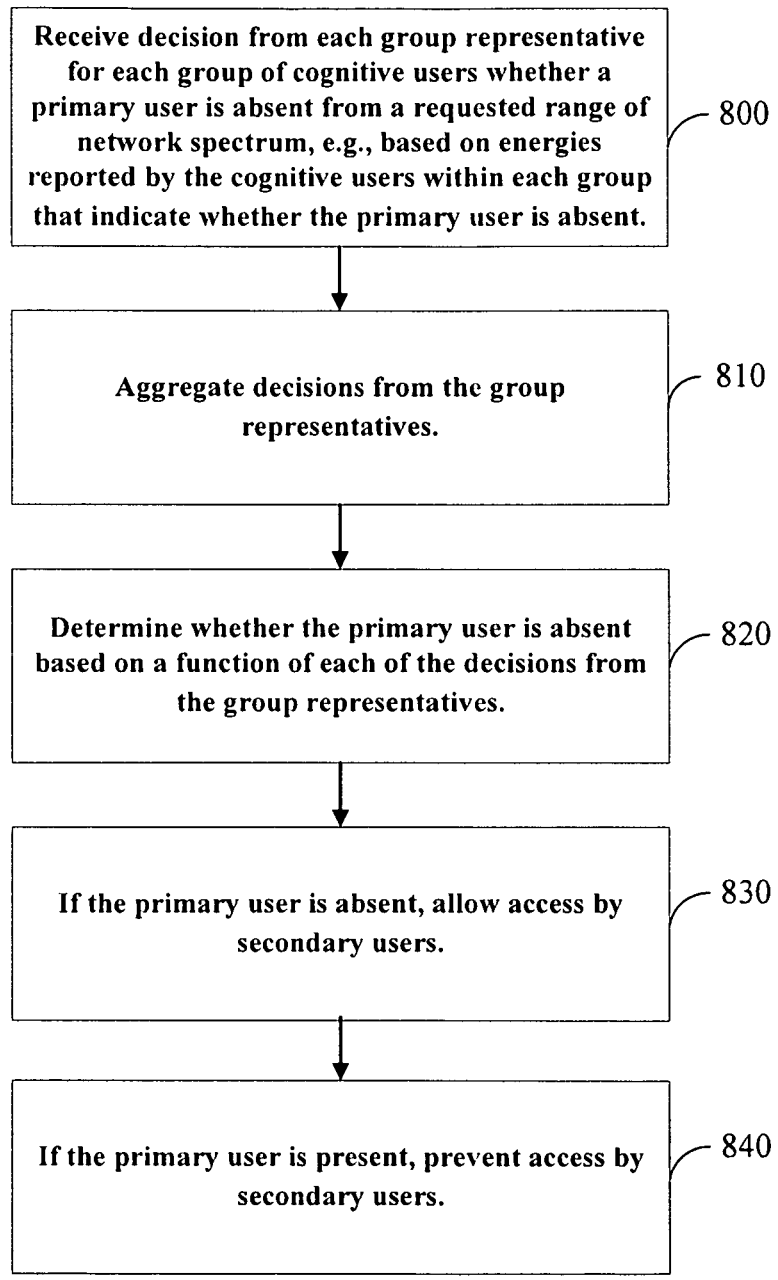
FIG. 8 illustrates a flowchart of a method of performing cluster-based cooperative spectrum sensing from the perspective of a common receiver.

Some of the above described embodiments have been set forth from the perspective of the cluster headsm or representatives for the clusters, making the decision on behalf of clusters or groups in the network. Other embodiments may be equally considered from the perspective of the common receiver receiving the decisions from the different representatives of the clusters or groups of cognitive users. For instance, as illustrated by the flow diagram of FIG. 8, a method from the perspective of a common receiver as described herein includes receiving, at 800, decision(s) from group representative(s) for each of a set of groups of cognitive users whether a primary user is absent from a requested range of network spectrum in the network. Each group decision by the group representative(s) can be based on energies reported by the cognitive users within the group that indicate whether the primary user is absent. At 810, the decisions from the group representatives are aggregated. At 820, the common receiver determines whether the primary user is absent based on a function of each of the decisions from the group representatives across the set of groups of cognitive users. At 830, based on the determining, if the primary user is absent, secondary users are allowed access to the requested range. If the primary user is present, at 840, secondary users are prevented from accessing the requested range.

In various non-limiting embodiments described herein, cluster-based cooperative spectrum sensing is provided over imperfect reporting channels in cognitive radio systems. To decrease the reporting errors introduced by the fading channels, user selection diversity is exploited in each cluster. For both decision fusion and energy fusion schemes, analytical performance results of the cluster-based cooperative spectrum sensing are derived and results show that the sensing performance is significantly better than conventional spectrum sensing.

Supplemental Context for Cognitive Radio Systems

Cognitive radio was conceived as an ideal goal towards which a software-defined radio platform should evolve: a fully reconfigurable wireless black box that automatically changes its communication variables in response to network and user demands.

With respect to the telecommunications industry, regulatory bodies in various countries found that most of the radio frequency spectrum is utilized inefficiently. For instance, it was found that cellular network bands are overloaded in most parts of the world, but amateur radio and paging frequencies are not. Independent studies performed confirmed that observation and concluded that spectrum utilization depends strongly on time and place. Moreover, fixed spectrum allocation prevents rarely used frequencies (those assigned to specific services) from being used by unlicensed users, even when their transmissions would not interfere at all with the assigned service. Accordingly, the rationale has developed for allowing unlicensed users to utilize licensed bands whenever it would not cause any interference (by avoiding them whenever threshold legitimate user presence is sensed).

Recently, for example, intense competition for spectrum usage has arisen, especially for the spectrum below 3 GHz. Studies from the Federal Communication Commission (FCC) show that the utilization of licensed spectrum only ranges from 15% to 85%. Aimed at making full use of the spectrum (white space), IEEE 802.22 Wireless Region Area Network (WRAN) Group is established to utilize the spectrum between 54 MHz and 862 MHz. As a candidate for WRAN, cognitive radio techniques have been pursued to exploit the existence of spectrum holes.

There are two main types of cognitive radio depending on the set of parameters taken into account in deciding on transmission and reception changes: (1) full cognitive radio, or Mitola radio, in which every possible parameter observable by a wireless node or network is taken into account and (2) spectrum sensing cognitive radio in which only the radio frequency spectrum is considered. In addition, as another distinguishing factor, with licensed band cognitive radio, bands assigned to licensed users can be used apart from unlicensed bands. With unlicensed band cognitive radio, only unlicensed parts of the radio frequency spectrum are used.

Spectrum sensing cognitive radio has become of increasing interest to the telecommunications industry. Applications of spectrum sensing cognitive radio include, but are by no means limited to, emergency networks and WLAN higher throughput and transmission distance extensions. A focus of spectrum sensing cognitive radio is in designing high quality spectrum sensing devices and algorithms for exchanging spectrum sensing data between nodes.

In this regard, the main functions of cognitive radios are: (1) spectrum sensing, (2) spectrum management, (3) spectrum mobility and (4) spectrum sharing. Spectrum sensing by a cognitive radio involves detecting unused spectrum and sharing it without harmful interference with other users. In this sense, a goal of cognitive radio networks is to sense spectrum holes, and one way to detect spectrum holes is to efficiently analyze primary users of the network.

Spectrum management involves capturing the best available spectrum to meet user communication requirements, i.e., cognitive radios should decide on the best spectrum band to meet any Quality of Service (QoS) requirements over all available spectrum bands involving spectrum analysis and decision-making.

In turn, spectrum mobility is defined as the process when a cognitive radio user exchanges its operative frequency. Cognitive radio networks aim to use spectrum dynamically by allowing radio terminals to operate in the best available frequency band, maintaining seamless communication requirements during the transition to better spectrum. As the name implies, spectrum sharing endeavors to provide a fair spectrum scheduling method for all nodes.

Exemplary Networked and Distributed Environments

One of ordinary skill in the art can appreciate that the various embodiments of cluster based cooperative spectrum sensing described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may use the cluster based cooperative spectrum sensing as described for various embodiments of the subject disclosure.

Figure 9:
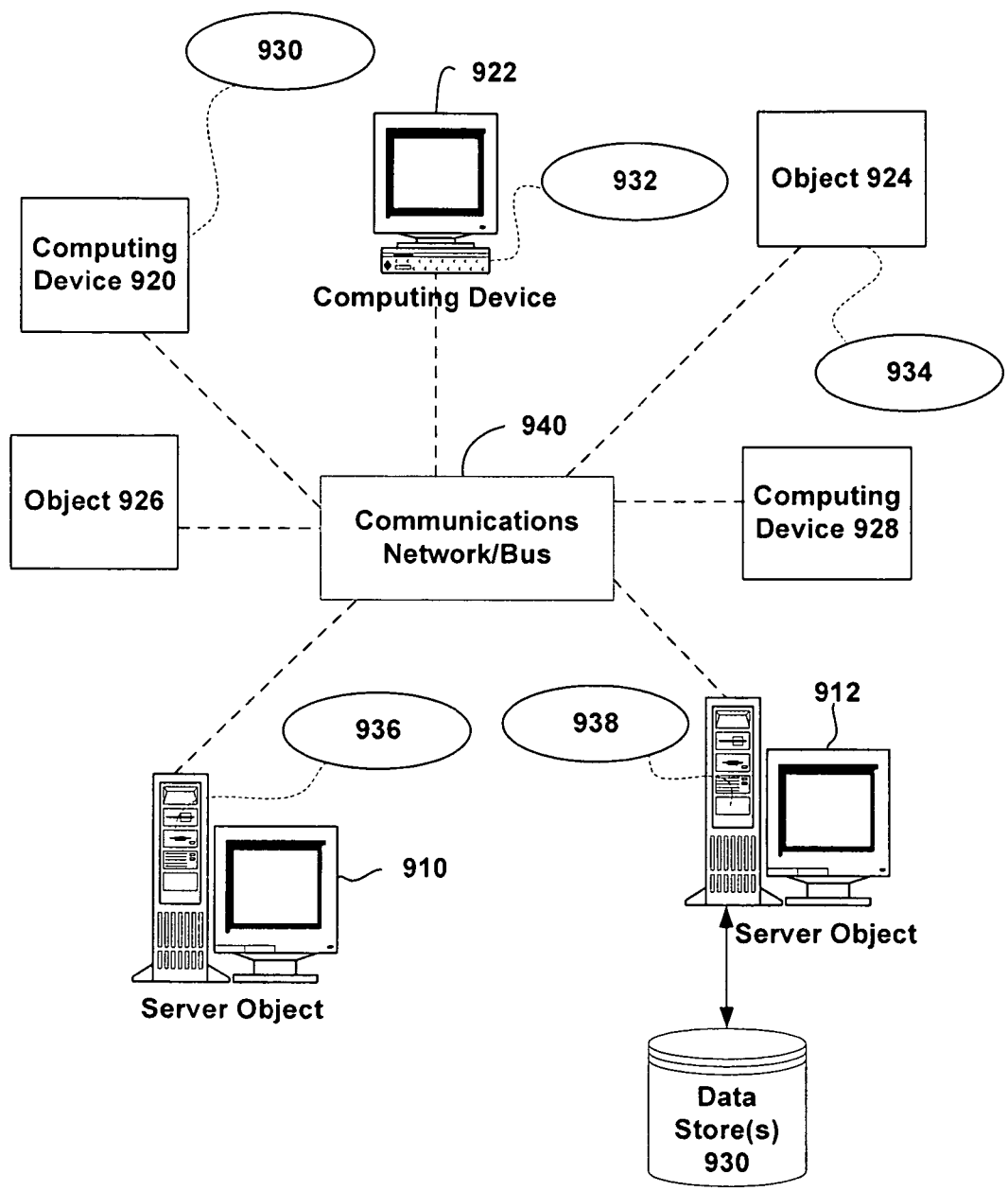
FIG. 9 is a block diagram representing an exemplary non-limiting networked environment.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that objects 910, 912, etc. and computing objects or devices 920, 922, 924, 926, 928, etc. may comprise different devices, such as PDAs, audio/video devices, mobile phones, MP3 players, personal computers, laptops, etc.

Each object 910, 912, etc. and computing objects or devices 920, 922, 924, 926, 928, etc. can communicate with one or more other objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each object 910, 912, etc. or 920, 922, 924, 926, 928, etc. can also contain an application, such as applications 930, 932, 934, 936, 938, that might make use of an API, or other object, software, firmware and/or hardware, suitable for communication with or implementation of the cluster based cooperative spectrum sensing provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the cluster based cooperative spectrum sensing as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 9, as a non-limiting example, computers 920, 922, 924, 926, 928, etc. can be thought of as clients and computers 910, 912, etc. can be thought of as servers where servers 910, 912, etc. provide data services, such as receiving data from client computers 920, 922, 924, 926, 928, etc., storing of data, processing of data, transmitting data to client computers 920, 922, 924, 926, 928, etc., although any computer can be considered a client, a server, or both, depending on the circumstances. Any of these computing devices may be processing data, or requesting services or tasks that may implicate the cluster based cooperative spectrum sensing as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the cluster based cooperative spectrum sensing can be provided standalone, or distributed across multiple computing devices or objects.

In a network environment in which the communications network/bus 940 is the Internet, for example, the servers 910, 912, etc. can be Web servers with which the clients 920, 922, 924, 926, 928, etc. communicate via any of a number of known protocols, such as the hypertext transfer protocol (HTTP). Servers 910, 912, etc. may also serve as clients 920, 922, 924, 926, 928, etc., as may be characteristic of a distributed computing environment.

Exemplary Computing Device

As mentioned, advantageously, the techniques described herein can be applied to any device where it is desirable to have secondary users use underutilized spectrum designated primarily for primary users. It should be understood, therefore, that handheld, portable and other computing devices and computing objects of all kinds are contemplated for use in connection with the various embodiments, i.e., anywhere that a device may request a service in a cognitive radio network. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 10:
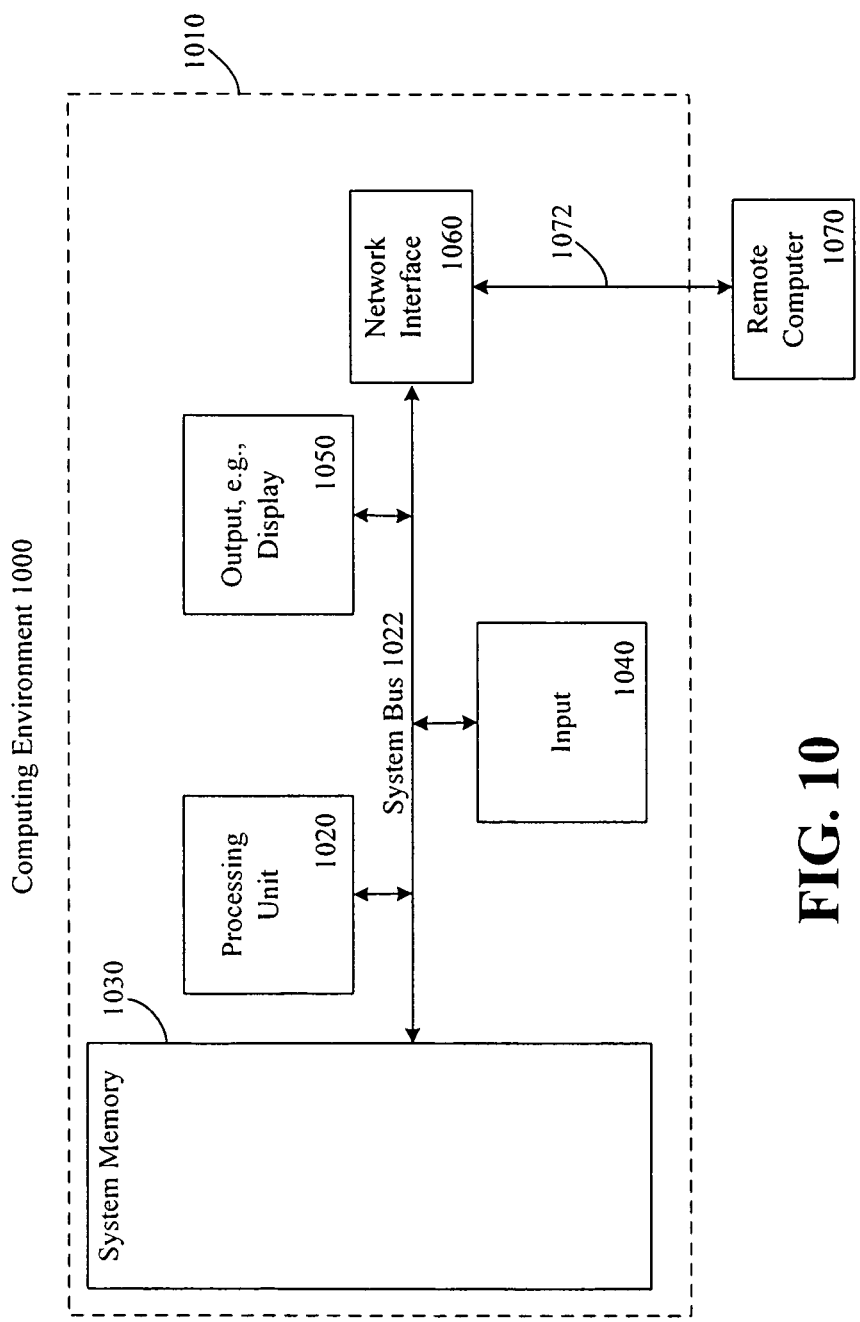
FIG. 10 is a block diagram representing an exemplary non-limiting computing system or operating environment.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither should the computing environment 1000 be interpreted as having any dependency or requirement relating to any one or combination of components illustrated in the exemplary operating environment 1000.

With reference to FIG. 10, an exemplary device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070, via network interface 1060. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet. It will be appreciated that the network connections shown and described are exemplary and other means of establishing a communications link between the computers may be used.

Exemplary Communications Networks and Environments

The above-described optimization algorithms and processes may be applied to any network, however, the following description sets forth some exemplary telephony radio networks and non-limiting operating environments for communications made incident to the cluster based cooperative spectrum sensing algorithms and processes of the present invention. The below-described operating environments should be considered non-exhaustive, however, and thus the below-described network architecture merely shows one network architecture into which the present invention may be incorporated. One can appreciate, however, that the invention may be incorporated into any now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

Figure 11:
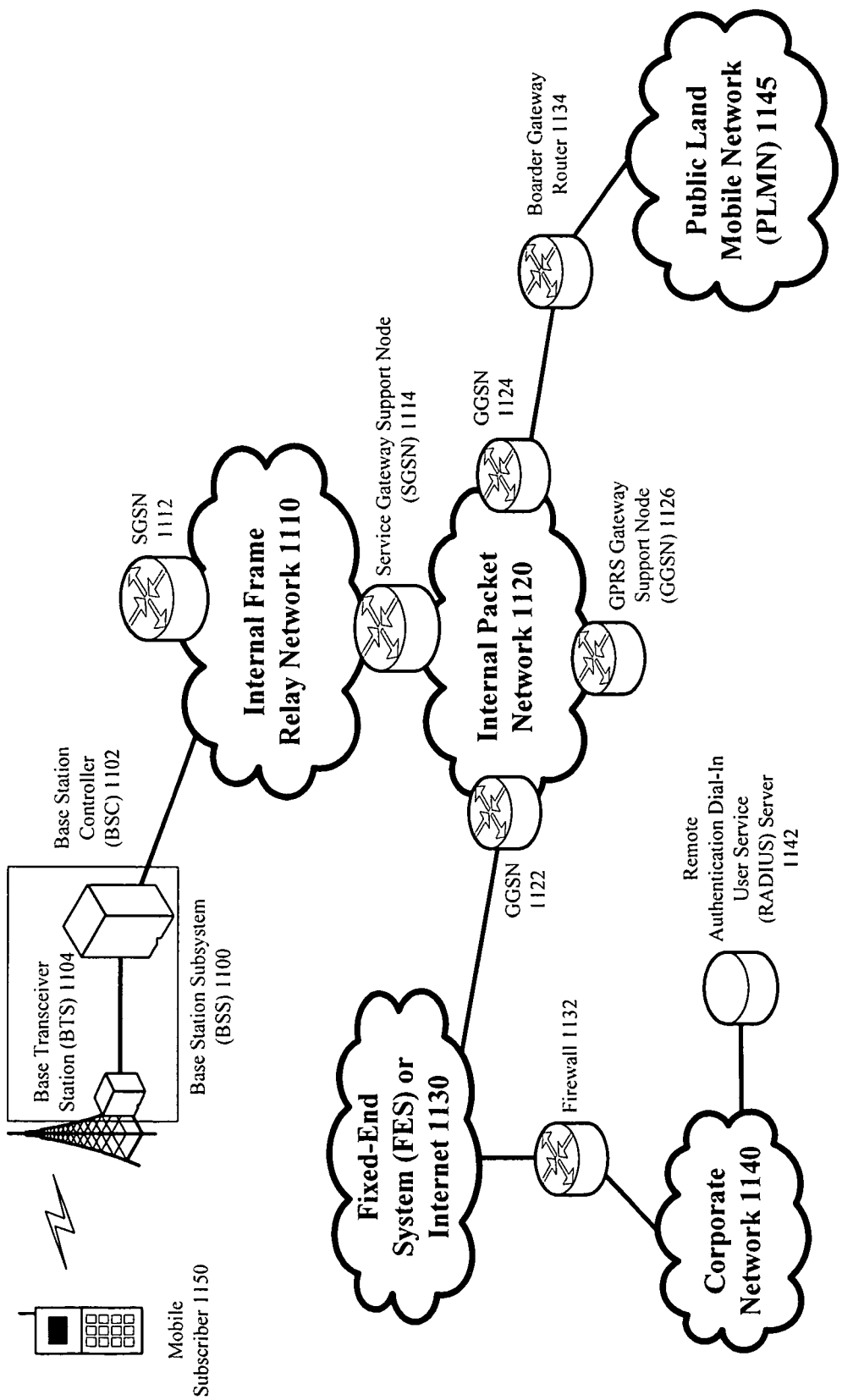
FIG. 11 illustrates an overview of a network environment suitable for transmission of data and service for the various embodiments described herein.

FIG. 11 depicts an overall block diagram of an exemplary packet-based mobile cellular network environment, such as a GPRS network, in which the invention may be practiced. In such an environment, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported over the air interface to a BTS 1108, and from the BTS 1108 to the BSC 1102.

Base station subsystems, such as BSS 1100, are a part of internal frame relay network 1110 that may include Service GPRS Support Nodes ("SGSN") such as SGSN 1112 and 1114. Each SGSN is in turn connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1145, corporate intranets 1140, or Fixed-End System ("FES") or the public Internet 1130. As illustrated, subscriber corporate network 1140 may be connected to GGSN 1124 via firewall 1132; and PLMN 1145 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Thus, network elements that may implicate the functionality of the optimization algorithms and processes in accordance with the invention may include but are not limited to Gateway GPRS Support Node tables, Fixed End System router tables, firewall systems, VPN tunnels, and any number of other network elements as may be required by a given network.

As mentioned above, while exemplary embodiments have been described in connection with various computing devices and network architectures, the underlying concepts may be applied to any network system and any computing device or system in which it is desirable to perform cooperative spectrum sensing in a cognitive radio network.

Also, there are multiple ways to implement the same or similar functionality, e.g., an appropriate API, tool kit, driver code, operating system, control, standalone or downloadable software object, etc. which enables applications and services to request network spectrum in a cognitive radio network according to the embodiments herein. Thus, the above described embodiments are contemplated from the standpoint of an API (or other software object), as well as from a software or hardware object that provides any of the various capabilities described above. Moreover, various embodiments described herein can have aspects that are wholly in hardware, partly in hardware and partly in software, as well as in software.

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the invention described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom.

While exemplary embodiments refer to utilizing the present invention in the context of particular programming language constructs, specifications or standards, the invention is not so limited, but rather may be implemented in any language to perform the cluster-based cooperative spectrum sensing processes. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:
1. A method, comprising:
receiving, by at least one cluster head device selected from a hierarchy of at least two clusters of cognitive devices, respective signals representing a function of respective energies measured by respective cognitive devices of the at least two clusters of cognitive devices; and
based on the respective signals from the respective cognitive devices, determining that a primary device is present in a portion of network spectrum being measured by the respective cognitive devices, wherein prior information about the primary device is not available to the respective cognitive devices,
wherein the at least one cluster head device is selected using a selection that reduces a reporting error due to fading in the portion of the network spectrum.

2. The method of claim 1, wherein the determining comprises performing a decision according to a fusion function.

3. The method of claim 1, further comprising decoding the respective signals from the respective cognitive devices.

4. The method of claim 1, further comprising selecting a cognitive device, as the at least one cluster head device, having a largest instantaneous reporting channels gain.

5. The method of claim 1, further comprising performing a fusion function based on a signal representing a decision of the at least one cluster head device.

6. The method of claim 5, wherein the performing the fusion function based on the signal representing the decision of the at least one cluster head device comprises performing a decision fusion (DF) function for cooperative spectrum sensing where a cognitive device in a cluster performs a binary decision by comparing an energy of the cognitive device to a threshold.

7. The method of claim 5, wherein the performing the fusion function based on the signal representing the decision of the at least one cluster head device comprises performing an energy fusion (EF) function where the at least one cluster head device collects the respective energies measured by the respective cognitive devices and compares the respective energies with a threshold.

8. The method of claim 1, further comprising:
receiving instantaneous channel state information (CSI) of a reporting channel from the primary device.

9. The method of claim 1, further comprising:
establishing a channel between at least two cognitive devices in a related cluster of the hierarchy of at least two clusters of cognitive devices as unobstructed.

10. The method of claim 1, wherein the at least one cluster head device is selected as a function of reporting error due to fading in the designated portion of the network spectrum.

11. The method of claim 1, further comprising aggregating decisions of the respective cognitive devices related to the primary device being present in the portion of the network spectrum.

12. The method of claim 1, further comprising preventing access to the portion of the network spectrum by a secondary device.

13. A tangible computer-readable medium having instructions stored thereon, the instructions comprising:
instructions for generating data as a function of reducing reporting error due to fading of cognitive devices in a network, for a group of a set of groups of cognitive devices in the network, the data is related to aggregated cluster-level decisions regarding a primary device being absent from a requested range of network spectrum in the network, wherein at least one group representative determines the aggregated cluster-level decisions based on energies reported by the cognitive devices within the group, whether the primary device is absent, wherein an identification of the primary device is unknown to the at least one group representative in advance; and
instructions for enabling access to the requested range of the network in response to the at least one group representative determining the primary device is absent.

14. A system, comprising:
a data set associated with cognitive devices configured to perform cooperative spectrum sensing of an availability of a portion of a network spectrum for unlicensed use by detection of an absence of a primary device licensed to use the portion of the network spectrum;
a cluster head device configured to determine for a cluster an optimal cognitive device of the cluster based on a comparison of the data set associated with the cognitive devices in the cluster, wherein energies detected by the cognitive devices in the cluster are collected at the cluster head device and wherein a selection of the cluster head device is based at least in part on a determination that a reporting error due to fading in the network spectrum will be reduced by the selection; and
a common receiver component configured to determine a cluster-level decision across clusters of at least two different clusters arranged in a hierarchical structure that the primary device is present in the portion of the network spectrum, wherein a priori knowledge of the primary device is unavailable.

15. The system of claim 14, wherein unlicensed user devices access the specified portion of the network spectrum in response to the primary device being absent from the specified portion.

16. The system of claim 14, wherein the common receiver component is configured to determine a fusion function of the cluster-level decision of the cluster head device.

17. The system of claim 16, wherein the fusion function is a decision fusion (DF) function for cooperative spectrum sensing or an energy fusion (EF) function for cooperative spectrum sensing.

18. The system of claim 14, wherein the optimal cognitive device is determined for the cluster by selection of the cognitive device having a largest instantaneous reporting channels gain.

19. The system of claim 14, wherein the cognitive devices in the cluster are adapted to receive instantaneous channel state information (CSI) of a reporting channel.

20. The system of claim 14, wherein a channel between any two cognitive devices in the same cluster is configured as unobstructed.

21. The system of claim 14, wherein the hierarchical structure is a two-level hierarchical structure.

22. A system, comprising:
means for receiving by a head cognitive device of a hierarchical cluster of cognitive devices designated as the head cognitive device based on a comparison of data related to the cognitive devices comprising energy data representing respective functions of respective energies measured by the cognitive devices; and
means for determining that a primary device is present in a portion of network spectrum based on the energy data measured by the cognitive devices, wherein prior knowledge of the primary device is inaccessible,
wherein designation of the head cognitive device is based on a determination that a reporting error due to fading in the portion of network spectrum will be mitigated by the designation.

23. The system of claim 22, wherein a selection of the head cognitive device is based in part on mitigation of reporting error due to fading in the designated portion of the network spectrum.

24. The system of claim 22, further comprising means for aggregating cluster-level decisions related to the primary device being present in the portion of the network spectrum.

25. The system of claim 22, further comprising means for preventing a secondary device access to the portion of network spectrum in response to the primary device being present.

26. A method, comprising:
- collecting energies of a reporting channel measured by one or more cognitive devices within a cluster;
- determining that a primary device is absent from a spectrum based in part on the energies, wherein information related to the primary device is not known in advance;
- aggregating cluster-level decisions relating to the primary device being absent, wherein the aggregating comprises mitigating a reporting error due to fading in the spectrum; and
- enabling a secondary device to utilize the spectrum in response to the determining that the primary device is absent.

27. The method of claim 26, wherein the aggregating cluster-level decisions is based on a fusion function of the cluster-level decisions.

28. The method of claim 27, wherein the fusion function comprises performing a decision fusion (DF) function for cooperative spectrum sensing that comprises at least one binary decision by comparing energy to a pre-defined threshold.

29. The method of claim 27, wherein the fusion function comprises performing an energy fusion (EF) function that comprises comparing a collected energy with a pre-defined threshold.

30. A system, comprising:
- a receiving component configured to aggregate energies from one or more clusters of cognitive devices configured in a hierarchical structure;
- a processing component configured to determine at least one device from the one or more clusters of cognitive devices based at least in part on reporting channel energies;
- an error component configured to analyze signal to noise ratios and bit error rates from the reporting channel energies;
- a fusion component configured to select the at least one device from the one or more clusters based in part on the signal to noise ratios and the bit error rates; and
- a component configured to enable a secondary device in response to a determination that a primary device is absent, wherein information related to the primary device is not known prior to the determination that the primary device is absent.

31. The system of claim 30, wherein the hierarchical structure is a two level hierarchical structure.

* * * * *